(12) United States Patent
Aamodt et al.

(10) Patent No.: US 7,670,716 B2
(45) Date of Patent: Mar. 2, 2010

(54) ELECTROCHEMICAL CELLS EMPLOYING EXPANDABLE SEPARATORS

(75) Inventors: Paul B. Aamodt, Howard Lake, MN (US); Joseph J. Viavattine, Vadnais Heights, MN (US)

(73) Assignee: Medtronic, Inc., Minneapolis, MN (US)

( * ) Notice: Subject to any disclaimer, the term of this patent is extended or adjusted under 35 U.S.C. 154(b) by 915 days.

(21) Appl. No.: 11/380,789

(22) Filed: Apr. 28, 2006

(65) Prior Publication Data

US 2007/0254210 A1   Nov. 1, 2007

(51) Int. Cl.
*H01M 2/14* (2006.01)
*H01M 2/18* (2006.01)
*H01M 2/16* (2006.01)

(52) U.S. Cl. ........................ 429/129; 429/131; 429/136; 429/141; 429/142

(58) Field of Classification Search ................. 429/129, 429/131, 136, 141, 142
See application file for complete search history.

(56) References Cited

U.S. PATENT DOCUMENTS

| | | | |
|---|---|---|---|
| 3,853,626 A * | 12/1974 | Daniels et al. | 29/2 |
| 4,336,314 A | 6/1982 | Yonezu et al. | |
| 4,531,281 A * | 7/1985 | Murray et al. | 29/25.03 |
| 5,716,729 A | 2/1998 | Sunderland et al. | |
| 6,967,828 B2 | 11/2005 | Miltich et al. | |
| 2005/0058895 A1 | 3/2005 | Aamodt | |

FOREIGN PATENT DOCUMENTS

| | | |
|---|---|---|
| EP | 1205987 A | 5/2002 |
| EP | 1205987 A2 * | 5/2002 |
| JP | 58165245 A | 9/1983 |
| JP | 59056354 A | 3/1984 |
| JP | 09161759 A | 6/1997 |
| JP | 2003217552 A | 7/2003 |

* cited by examiner

*Primary Examiner*—Melvin C Mayes
*Assistant Examiner*—Eli Mekhlin

(57) ABSTRACT

An electrochemical cell is provided comprising a first electrode and a second electrode. A separator, which includes an expansion joint, surrounds and seals the first electrode. The separator may comprise a first major surface and a second major surface substantially opposite the first major surface, and the expansion joint may be coupled between the first major surface and the second major surface.

9 Claims, 5 Drawing Sheets

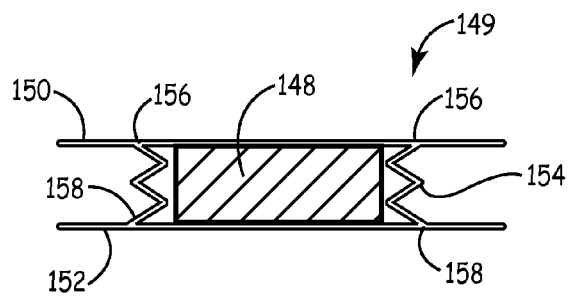
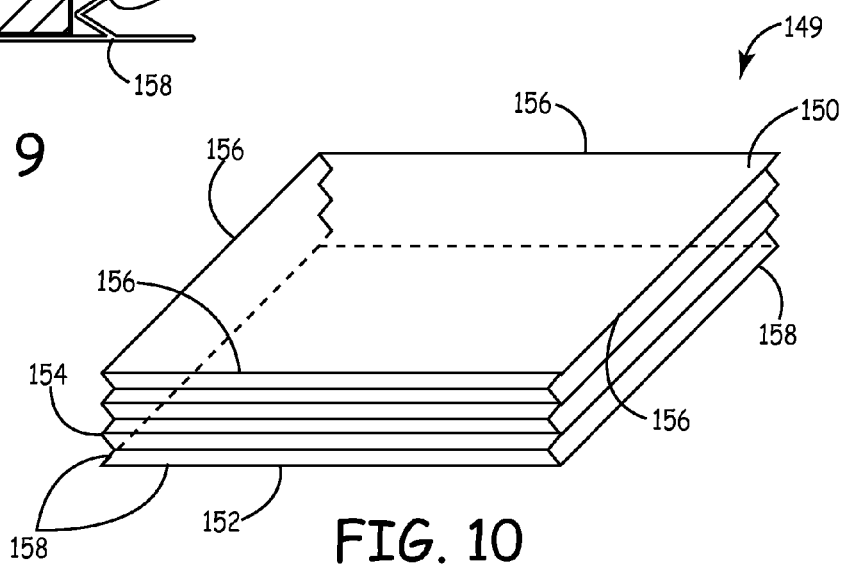
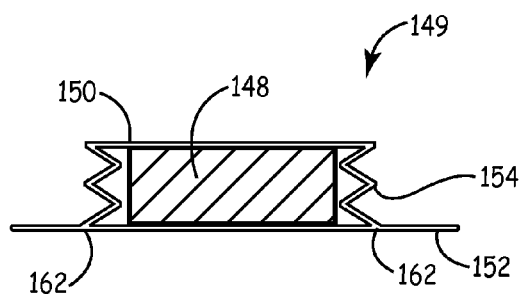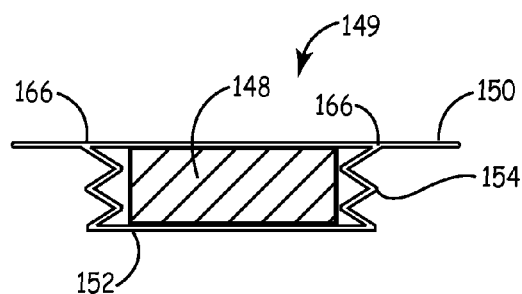
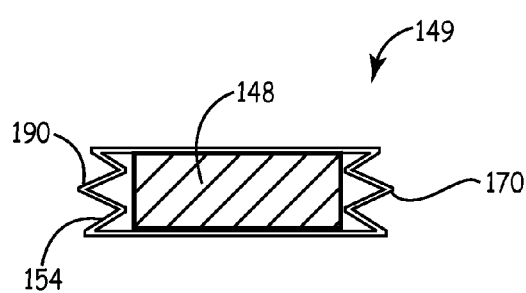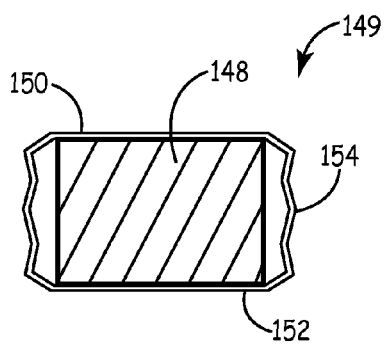

ELECTROCHEMICAL CELLS EMPLOYING EXPANDABLE SEPARATORS

TECHNICAL FIELD

This invention relates generally to an implantable medical device (IMD) and, more particularly, to an electrochemical cell for use in an IMD wherein separation between the electrodes is maintained by means of a separator having an expandable joint.

BACKGROUND OF THE INVENTION

Electrochemical cells, such as batteries and capacitors, are important components in IMDs (e.g., implantable defibrillators) because they store and deliver the energy necessary to correct cardiac arrhythmias (e.g., tachycardia, bradycardia, atrial fibrillation, and/or ventricular fibrillation). Ideally, such batteries should have a high rate capability to provide the required charge, possess low self-discharge to increase useful life, and be highly reliable. Further, because these medical devices are being surgically implanted within a patient's body, the battery should be as compact as possible. Lithium batteries are now commonly used in IMDs and generally include a lithium anode and a cathode that may contain carbon monofluoride and/or silver vanadium oxide. The anode and cathode are enveloped in an electrolyte, or electrolytic solution, containing a solute (typically a lithium salt such as $LiCF_3$) and a solvent (e.g., dimethoxyethane).

It is known that the electrodes (e.g., anode and cathode) are separated to prevent arcing and to allow charge to accumulate without short-circuiting the electrochemical cell. Such separators should be resistant to degradation, have sufficient thickness to maintain inter-electrode separation without interfering with cell performance, and exhibit sufficient surface energy to augment electrolyte wettability and absorption. In addition, the separator should have an electrical resistivity sufficiently high to prohibit short circuit current from flowing directly between the electrodes through the separator. These requirements are balanced by the need for a porosity sufficient to freely permit ionic communication between the electrodes.

Separators may be made from a roll or sheet of separator material, and a variety of separator materials have been used. Paper (e.g., Kraft paper) is a cellulose-based separator material that is sometimes used and may be manufactured with high chemical purity. An alternative to paper separators are polymeric separators that may be made of microporous films (e.g., polytetrafluoroethylene) or polymeric fabrics (e.g., a woven synthetic halogenated polymer). Hybrid separators employing polymers (e.g., polypropylene or polyester) and paper are also known.

Separators having strong tensile properties are less likely to tear or break during fabrication and are better able to withstand internal stresses due to changes in the electrode volumes during discharge and re-charging cycles. Cathode material may swell as a battery is discharged. Thus, the space made available for batteries in medical devices may be somewhat larger than the non-swollen size of the battery thereby increasing the overall size of the medical device. When a separator is sealed around and envelopes a cathode, the volumetric expansion places stresses on the separator, perhaps causing tearing or rupturing of the separator that, in turn, may cause short circuits. This problem is exacerbated when thicker cathodes, which experience greater expansion (e.g., 100 percent), are employed.

According, it would be desirable to provide an electrochemical cell separator assembly that accommodates greater electrode expansion without requiring increased separator margin (i.e., the distance between the edge of a cathode and the edge of the separator seal). In addition, it would further be desirable to provide a separator assembly including an expandable separator joint for accommodating electrode expansion while reducing the possibility of separator rupture. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The following drawings are illustrative of particular embodiments of the invention and therefore do not limit the scope of the invention, but are presented to assist in providing a proper understanding. The drawings are not to scale (unless so stated) and are intended for use in conjunction with the explanations in the following detailed descriptions. The present invention will hereinafter be described in conjunction with the appended drawings, wherein like reference numerals denote like elements, and:

FIG. 9 is a cross-sectional view of a separator prior to trimming in accordance with a first embodiment of the present invention;

FIG. 10 is an isometric view of the separator shown in FIG. 9 after trimming;

FIGS. 11, 12, and 13 are isometric views of the separator shown in FIG. 9 illustrating first, second, and third alternative ways, respectively, in which the separator may be made;

FIG. 14 is a cross-sectional view of the separator shown in FIG. 9 in an expanded state;

DETAILED DESCRIPTION OF THE EXEMPLARY EMBODIMENT

The following description is exemplary in nature and is not intended to limit the scope, applicability, or configuration of the invention in any way. Rather, the following description provides a convenient illustration for implementing an exemplary embodiment of the invention. Various changes to the described embodiment may be made in the function and arrangement of the elements described herein without departing from the scope of the invention.

Figure 1:
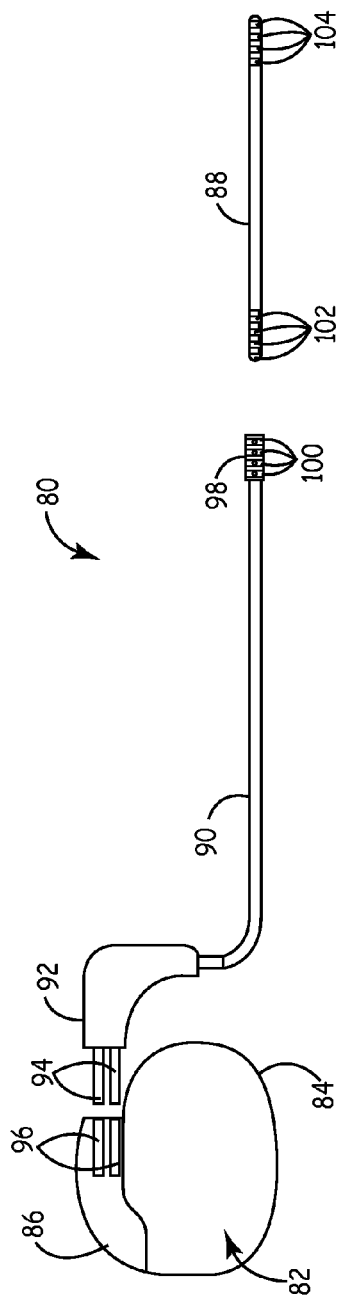
FIG. 1 is an exploded view an implantable medical device.

FIG. 1 is an exploded view of an implantable medical device 80. Medical device 80 may be, for example, a cardioverter defibrillator capable of monitoring cardiac signals and delivering therapy pulses to pace a patient's heart and, if necessary, to treat ventricular fibrillation. Device 80 includes a pulse generator 82 comprising a canister 84 (e.g., a biocompatible metal, such as titanium, aluminum, steel, etc.) having a connector block 86 fixedly coupled thereto. Connector block 86 is coupled to a lead 88 by way of an extension 90. The proximal portion of extension 90 comprises a connector 92 having two connection prongs 94 extending therefrom. Prongs 94 are configured to be received or plugged into two ports 96 provided within connector block 86. One or more setscrew blocks may be provided within connector block 86 and tightened (e.g., via a torque wrench) upon insertion of prongs 94 into ports 96 to fixedly secure connector 92 to pulse generator 82.

The distal end of extension 90 is provided with a connector portion 98 having a plurality of contacts 100 disposed thereon. The proximal end of lead 88 also includes a plurality of contacts 102 thereon, and the distal end of lead 88 includes a plurality of distal electrodes 104. Connector portion 98 is configured to receive the proximal end of lead 88 so as to electrically couple contacts 100 to contacts 102. Lead 88 and extension 90 each comprise an insulative tubing that carries a plurality of conductive filers. For example, lead 88 and extension 90 may each comprise a polyurethane or silicon tube having an insulative silicon core. Each filer passes through the silicon core, possibly within a narrower polyurethane tube to provide redundant insulation. The filers carried within lead 88 electrically couple proximal contacts 102 to distal electrodes 104, and the filers carried within extension 90 electrically couple prongs 94 to contacts 100. Thus, when connector 92 is plugged into connector block 86, and when the proximal end of lead 88 is received by connector portion 98, pulse generator 82 may send electrical signals to and receive electrical signals from distal electrodes 104.

Figure 2:
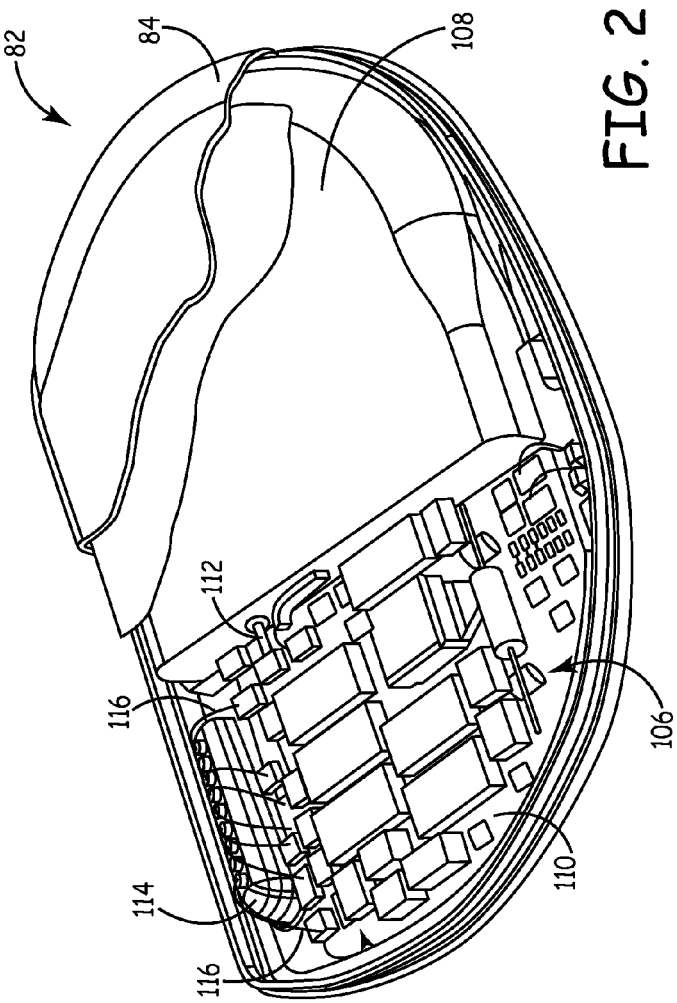
FIG. 2 is an isometric cutaway view of the pulse generator employed in the implantable medical device shown in FIG. 1.

FIG. 2 is an isometric cutaway view of pulse generator 82 (FIG. 1). Here, it may be seen that canister 84 houses a battery 108 and control circuitry 106, which is mounted on a printed circuit board 110. Battery 108 may be coupled to circuitry 106 via a lead 112. A multipolar feedthrough assembly 114 guides an array of terminal pins through canister 84. At their first ends, the terminal pins of assembly 114 are electrically coupled to circuitry 106 via a first plurality of connective wires 116 (e.g., gold). At their opposite ends, the terminal pins of assembly 114 may be coupled to a second plurality of wires (not shown) that extends through connector block 86 to contact prongs 94 (FIG. 1). In this way, circuitry 106 may be electrically coupled to distal electrodes 104. When lead 88 is positioned within or proximate a patient's heart, circuitry 106 may monitor cardiac signals detected by distal electrodes 104. If determining that the heart is experiencing an arrhythmia (e.g., bradycardia, tachycardia, or fibrillation), circuitry 106 may cause battery 108 to deliver therapy (e.g., pacing or defibrillating electrical pulses) via electrodes 104 to return the heart to its normal rhythm.

In battery 108 and other such electrochemical cells, the electrodes (e.g., the anode and cathode) must remain physically separated to prevent shorting. As explained above, separators have been employed that physically partition the electrodes while permitting the flow of electrolytic fluid there between. Generally, such separators comprise one or more sheets of insulative material (e.g., paper, polymer, paper/polymer hybrids, etc.) that form a pouch or envelope, which receives a selected electrode (e.g., a cathode) therein. As explained more fully below, the enveloped electrode may swell during operation of the electrochemical cell. Therefore, the separator envelope must be capable of expanding without rupturing to accommodate the volumetric growth of the electrode.

Figure 3:
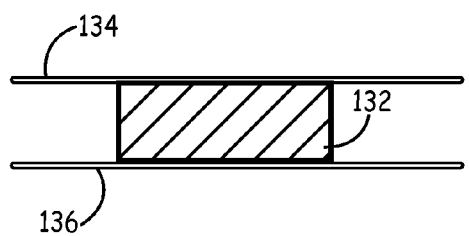
FIGS. 3-5 illustrate steps in the manufacture of a separator in accordance with the prior art.
Figure 4:
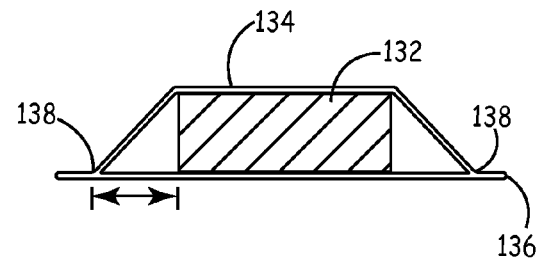
Figure 5:
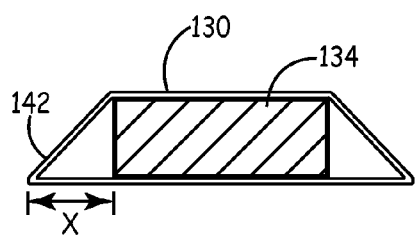
Figure 6:
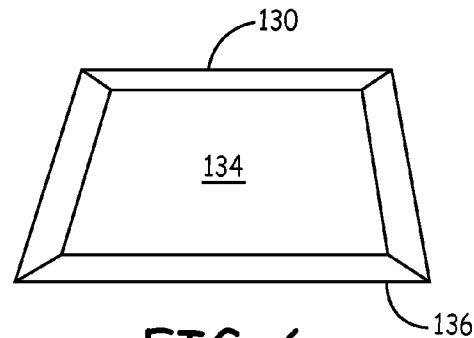
FIG. 6 is an isometric view of the separator shown in FIGS. 3-5.

FIGS. 3-6 illustrate steps in the manufacture of a separator 130 in accordance with the prior art. Referring to FIG. 3, an electrode 132 is disposed between first and second sheets 134 and 136 of separator material (e.g., polymeric film). Electrode 132 may be, for example, the cathode of a battery (e.g., battery 108 described above in conjunction with FIG. 2). Separator sheets 134 and 136 are sealed together to enclose electrode 132. In particular, the edges of separator sheet 134 may be folded toward sheet 136 and sealed thereto along seam 138 as shown in FIG. 4. The edges of separator sheet 134 are joined to sheet 136 using known heating techniques. The excess portions of sheet 136 (and/or sheet 134) extending beyond seam 138 may be trimmed away to leave electrode 132 sealed within an insulative envelope 142 formed by separator sheets 134 and 136 as is shown in FIG. 5 (a cross-sectional view) and in FIG. 6 (an isometric view).

Figure 7:
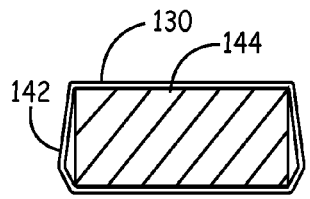
FIG. 7 is cross-sectional view of the separator shown in FIGS. 3-6 in an expanded state.

As mentioned above, electrode 132 may swell during operation of an electrochemical cell employing electrode 132. If electrode 132 is the cathode of a battery, for example, it may absorb electrolytic fluid and anode material (e.g., lithium) during discharge. To provide for the expansion of electrode 132 and to avoid rupturing of the separator, additional room is allotted within the separator envelope beyond that which is needed to accommodate electrode 132 in its normal, unexpanded state. Specifically, a lateral separator margin (designated X in FIG. 5) is provided between the lower periphery of electrode 132 and seam 138. As electrode 134 swells, the height (and, perhaps, the width and length) of electrode 134 increases. The outer surfaces of electrode 134 thus press outwardly on the inner surfaces of separator 130, and separators sheets 134 and 136 diverge. As shown in FIG. 7, separator 130 expands and the additional volumetric space provided by separator margin X is consumed by electrode 132 in its swollen condition.

Figure 8:
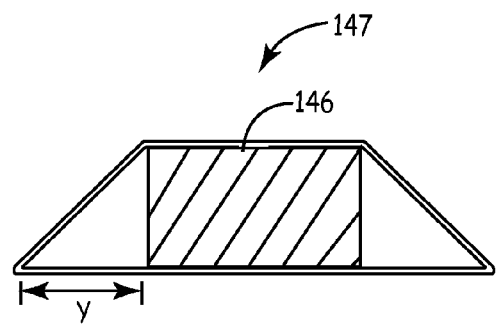
FIG. 8 is a cross-sectional view of a second known separator enveloping a relatively thick electrode.

The need to provide separator margin results in an increase in the overall size of the separator envelope, which, in turn, increases the dimensions of an electrochemical cell employing the separator. The separator margin may be made even larger with the increased use of thicker cathodes, which may experience even greater expansion (e.g., 100%). To illustrate this point, FIG. 8 is a cross-sectional view of a separator 147 disposed around a relatively thick electrode 146. As can be seen, separator 147 is provided with a lateral margin Y, which is considerably larger than margin X of separator 130 (FIG. 5).

FIGS. 9 and 10 are cross-sectional and isometric views, respectively, of a separator 149 in accordance with a first embodiment of the present invention. In a similar manner to separator 130 (FIGS. 3-7), separator 149 comprises upper and lower separator sheets 150 and 152 between which an electrode 148 is disposed. However, unlike separator 130, an expansion member or joint 154 (e.g., an accordion-shaped sleeve) is circumferentially disposed around electrode 148. Expansion joint 154 is sealed to separator sheet 150 along seam 156 and to separator sheet 152 along seam 158. Sealing may be accomplished with, for example, a soldering iron or other tool capable of applying heat while pressing portions of sheets 150 and 152 together. As was the case previously, separator sheets 150 and 152 are comprised of an insulative and porous material, such as an insulative paper, polymer, or paper/polymer hybrid. Though joint 154 may also comprise a similar or identical material, expansion joint 154 need not be porous. Thus, a wide variety of materials may be utilized for expansion joint 154, providing that the selected material is insulative and may be bonded to separator sheets 150 and 152. Preferably, a material having a high degree of strength and flexibility is employed, such as a polyolefin film. Expansion joint 154 may be formed by pre-setting (e.g., hand-creasing, heat-setting, etc.) one or more folds bends into a section of the selected insulative material. The folds or bends may each be generally V-shaped as shown in FIGS. 9-14 or, instead, may each be generally curved as described below. After expansion joint 154 has been bonded to separators sheets 150 and 152, any excess material (e.g., the portions of sheet 150 and/or sheet 152 extending beyond seams 156 and 158) is trimmed off and discarded (FIG. 10).

Though expansion joint 154 was described above as an independent sleeve that was sealed between separator sheets 150 and 152, it should be appreciated that joint 154 may be formed in other ways. For example, as indicated in FIG. 11, expansion joint 154 may be formed (e.g., folded, heat-set, etc.) in a periphery of separator sheet 150 that is subsequently folded toward separator sheet 152 and sealed thereto along seam 162. Similarly, as indicated in FIG. 12, expansion joint 154 may be formed in a periphery of separator sheet 152 and subsequently sealed to separator sheet 150 along seam 166. Furthermore, a combination of these two approaches may be taken wherein a portion of expansion joint 154 is formed in the peripheries of each of separator sheets 150 and 152, which are then folded toward one another and sealed together along seam 170 as shown in FIG. 13.

FIG. 14 is a cross-sectional view of separator 149 after electrode 148 has swelled. As can be seen, separator 149 has expanded along expansion joint 154 to accommodate the growth of electrode 148 and the corresponding divergence of separator sheets 150 and 152. It should thus be appreciated that, like conventional separators (e.g., separator 130), inventive separator 149 is capable of accommodating a relative large degree of electrode swelling without rupture. However, in contrast to known separators, separator 149 has a smaller separator margin and, therefore, a more compact size. This may be appreciated by comparing the separator margin X of separator 130 (FIG. 5) and margin Y of separator 147 (FIG. 7) to the separator margin of separator 149 (FIGS. 9, 11-13). Thus, a more compact electrochemical cell may be achieved by employing the inventive separator.

Figure 15:
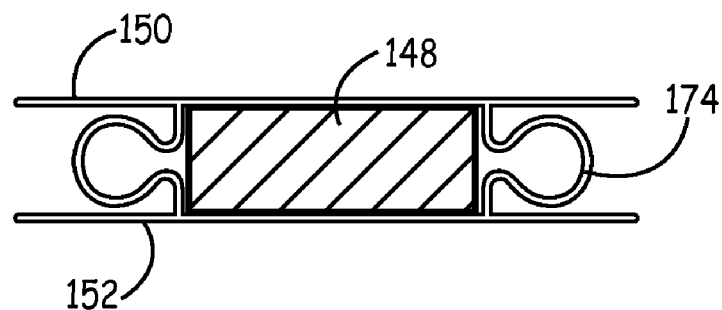
FIGS. 15, 16, and 17 are cross-sectional views of separators in accordance with second, third, and fourth embodiments of the present invention, respectively.
Figure 16:
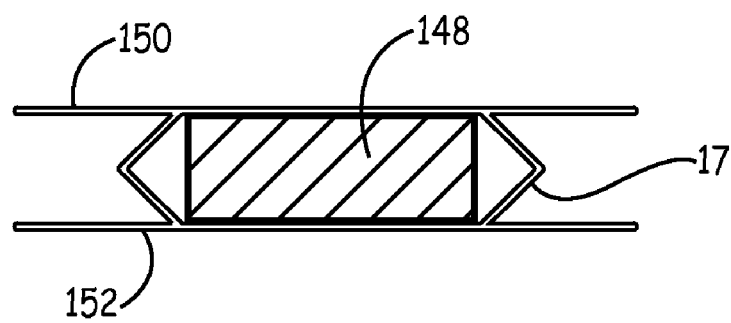
Figure 17:
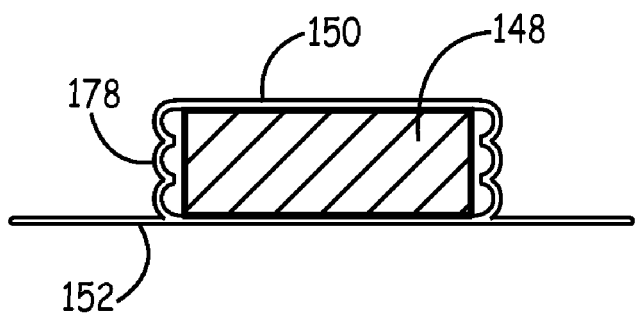

Although the exemplary expansion joint (i.e., joint 154) is generally accordion-shaped, it should be noted that expansion joints of a variety shapes are contemplated. To this end, FIGS. 15-17 illustrate three alternative expansions joints. In particular, FIG. 15 illustrates a second expansion joint 174 having the general shape of a strain relief spring or the Greek letter omega. Expansion joint 174 is disposed between separator sheets 150 and 152 and sealed thereto as described above. FIG. 16 illustrates a V-shaped expansion joint 176 also disposed between and sealed to sheets 150 and 152. Finally, FIG. 17 illustrates an generally a scalloped or crenate expansion joint 178 that is formed by folding separator sheet 150 downward and sealing sheet 150 to sheet 152 in the manner previously described. Alternatively, expansion joint 178 (or other expansion joint) may be formed from a single, relatively large separator sheet by folding the sheet in half and sealing three overlapping portions of the sheet together proximate electrode 148.

Figure 18:
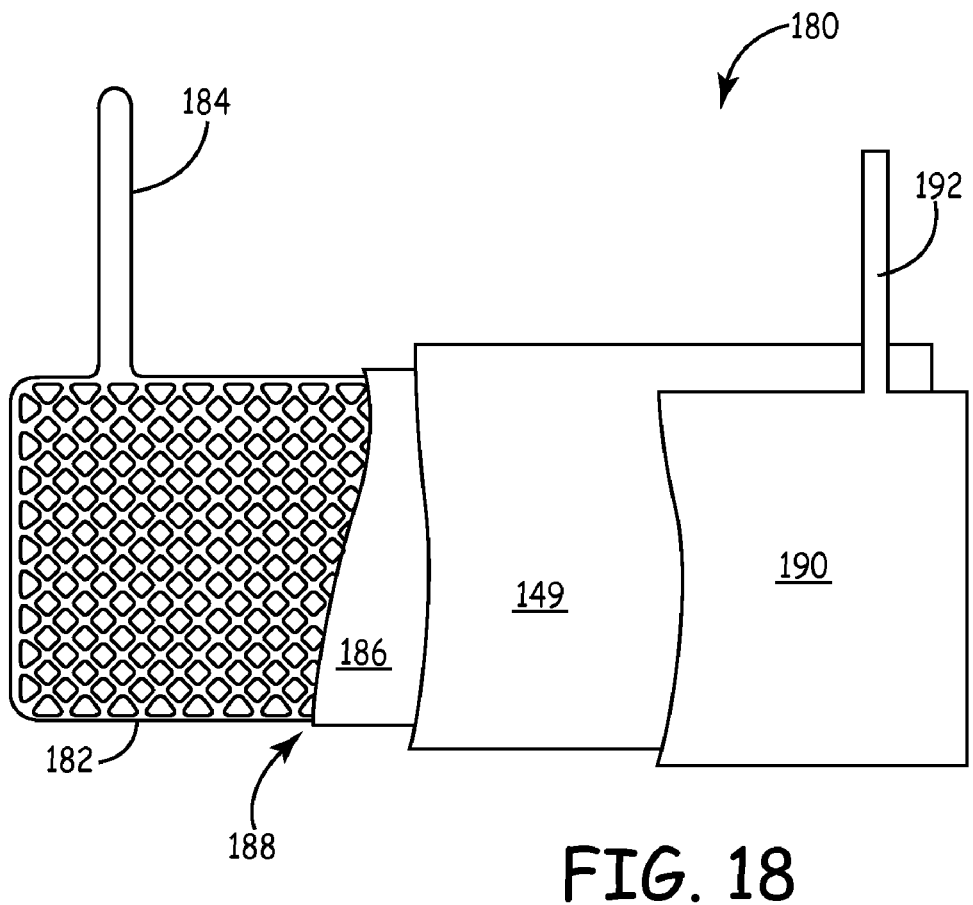
FIGS. 18 and 19 are side and top cutaway views, respectively, of an electrochemical cell employing the inventive separator.
Figure 19:
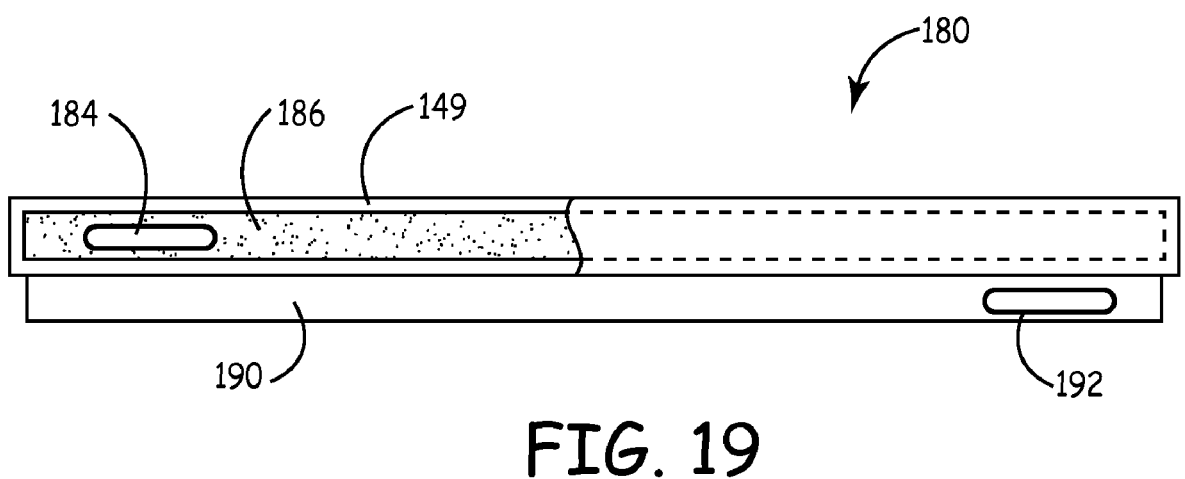

FIGS. 18 and 19 are side and top cutaway views of an electrode assembly 180 employing separator 149 (FIGS. 9-14). A current collector 182 comprises a flattened metal plate (e.g., titanium) having a plurality (e.g., a grid) of apertures therethrough and a lead 184 extending therefrom. Active material 186 (e.g., silver vanadium oxide powder) is disposed on either side of collector 182 to form an electrode 188 (e.g., a cathode), which is encased by separator 149 as described above. A slot (not shown) may be provided through separator 149 to accommodate lead 184. A second electrode 190 (e.g., an anode) having a second lead 192 extending therefrom is disposed adjacent electrode 188. Electrode assembly 180 may be disposed within a battery casing, which is sealed and filled with an electrolytic fluid. When so disposed, separator 149 prevents physical contact between electrodes 188 and 190, but permits the flow of electrolytic fluid there between.

Considering the foregoing, it should be appreciated that there has been provided an electrochemical cell separator assembly that accommodates greater electrode expansion without requiring increased separator margin (i.e., the distance between the edge of a cathode and the edge of the separator seal). It should further be appreciated that a separator assembly has also been provided including an expandable separator joint for accommodating electrode expansion while reducing the possibility of separator rupture. Although the invention has been described with reference to a specific embodiment in the foregoing specification, it should be appreciated that various modifications and changes can be made without departing from the scope of the invention as set forth in the appended claims. Accordingly, the specification and figures should be regarded as illustrative rather than restrictive, and all such modifications are intended to be included within the scope of the present invention.

What is claimed is:

1. An electrochemical cell, comprising:
   a first electrode;
   a second electrode; and
   a separator surrounding and sealing said first electrode, said separator comprising an upper sheet of separator material, a lower sheet of separator material substantially opposite the upper sheet of separator material, and an expansion joint, wherein the expansion joint is a separate and distinct length of separator material that extends between and is bonded to the upper and lower sheets of separator material.

2. An electrochemical cell according to claim 1 wherein said electrochemical cell is a battery and wherein said first electrode is a cathode.

3. An electrochemical cell according to claim 1 wherein said expansion joint comprises a sleeve disposed substantially around said separator.

4. An electrochemical cell according to claim 1 wherein said expansion joint comprises a substantially non-porous material.

5. An electrochemical cell according to claim 1 wherein said separator includes at least one seam between said first major surface and said second major surface.

6. An electrochemical cell according to claim 1 wherein said separator includes at least a first seam and a second seam, said first seam between said first major surface and said expansion joint, and said second seam between said second major surface and said expansion joint.

7. An electrochemical cell according to claim 1 wherein said expansion joint has an accordion-like shape.

8. A battery, comprising:
an anode;
a cathode; and
a separator surrounding and sealing said cathode, said separator comprising an upper sheet of separator material, a lower sheet of separator material substantially opposite the upper sheet of separator material, and an expansion joint, wherein the expansion joint is a separate and distinct length of separator material that extends between and is bonded to the upper and lower sheets of separator material.

9. A battery according to claim 8 wherein said expansion joint comprises an accordion-shaped sleeve circumferentially disposed around said cathode.

* * * * *